United States Patent Office 3,011,579
Patented Dec. 5, 1961

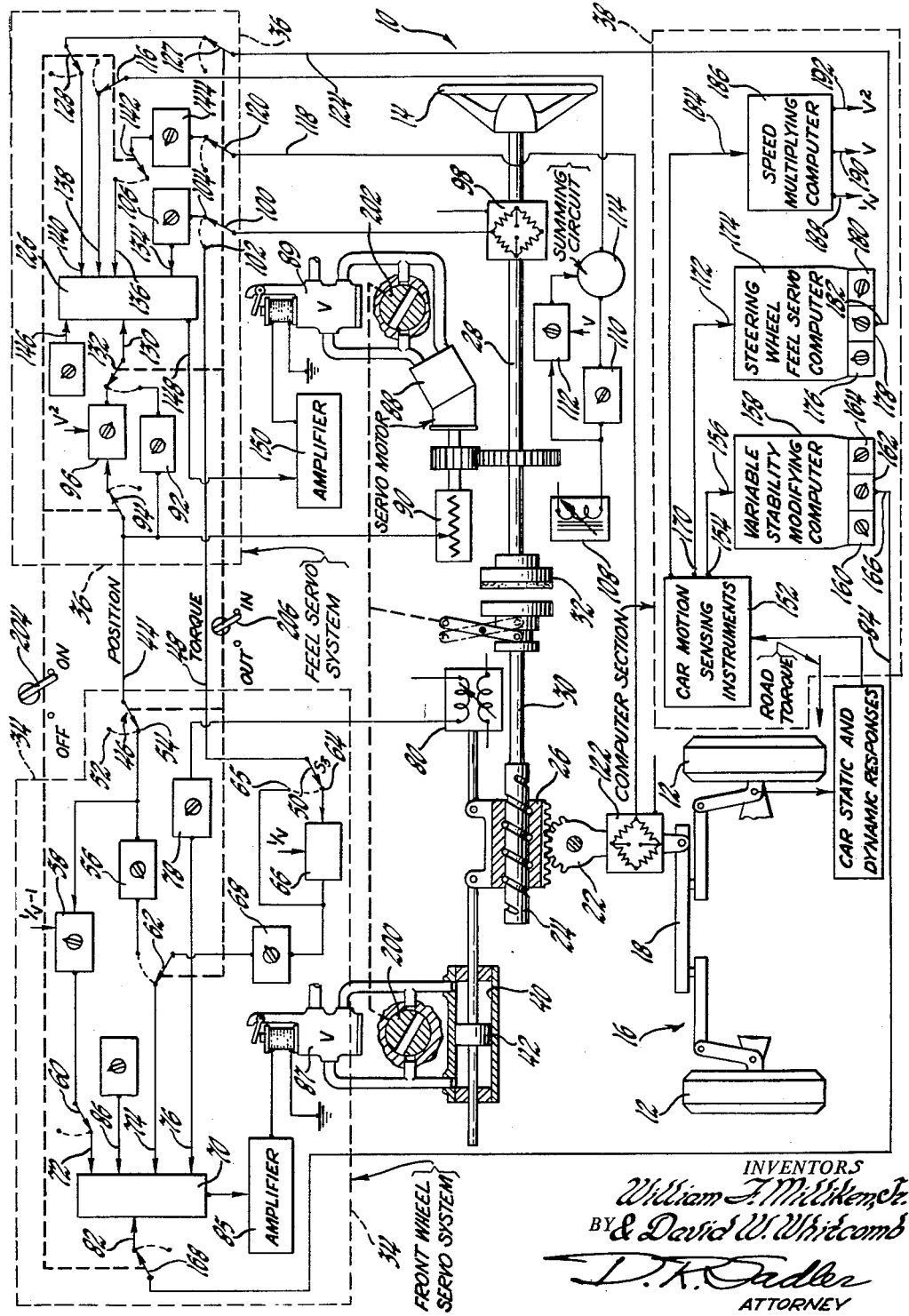

3,011,579
STEERING SYSTEM
William F. Milliken, Jr., Williamsville, and David W. Whitcomb, East Aurora, N.Y., assignors to General Motors Corporation, Detroit, Mich., a corporation of Delaware
Filed Jan. 8, 1959, Ser. No. 785,744
7 Claims. (Cl. 180—79.2)

The present invention relates to automotive vehicles and, more particularly, to steering systems therefor.

At the present time automotive vehicles are controlled by the operator manually turning a steering wheel located on a steering column mechanically connected to dirigible road wheels. Thus, turning the steering wheel will direct the vehicle in the desired direction. In order to relieve the operator of a portion of the work, a power assist unit may be provided to supplement the manual power supplied by the driver. However, in such installations, the steering wheel is mechanically connected directly to the dirigible wheels at all times and the steering ratio is determined by the mechanical linkage and thus cannot be varied. In some installations such as the off the road vehicles, ships and other heavy equipment, the steering may be accomplished by power means which are remotely controlled by the operator. Although there may be no direct mechanical interconnection between the steering control and steering members, the steering ratio does not vary with operating conditions.

In all of the foregoing devices, although the steering ratio may vary with the amount of displacement of the dirigible wheels, the steering ratio has been independent of the various operating conditions of the vehicle. In addition, the amount of supplementary power supplied to the steering system by power means has been substantially independent of the operating conditions of the vehicle. As a result, when the operating conditions change, the driver must vary his responses with these changing operating conditions. Not infrequently, the driver does not quickly sense the changing conditions and also he does not properly compensate for the changes.

It is now proposed to provide a steering system having means for sensing the various operating conditions of the vehicle and to thereby vary the response of the steering system. In addition, forces will be applied to the steering system which will provide the operator with a "feel" that will improve his ability to sense the operating characteristics of the vehicle much more quickly and accurately. This, in turn, will reduce his response time and assist him in making the correct response. More particularly, this is to be accomplished by providing a steering system in which the dirigible wheels are moved entirely by power means controlled by an electronic circuit actuated by movement of the steering wheel. In addition, various pickup means are provided for sensing the operating characteristics of the vehicle such as the roll of the vehicle, the yaw, the lateral acceleration, the velocity and various other factors and producing signals indicative thereof. These signals are then utilized to modify actuation of the power means to thereby change the steering system in accordance with these various operating conditions. Also, the signals will be effective to actuate suitable means for applying counter torques to the steering wheel and will be indicative of these conditions and thereby enable the operator to sense the operating conditions.

The drawing is a schematic diagram of a steering system embodying the present invention.

Referring to the drawing in more detail, the present invention is embodied in a steering system 10 for positioning the dirigible road wheel 12 on the vehicle in response to a driver manually rotating a steering wheel 14. The dirigible wheels 12 are actuated by a steering linkage 16 comprising a drag link 18 driven from a gear box containing a sector gear 22, a worm 24 and a worm nut 26. The steering wheel 14 is located on the upper steering column 28 while the worm gear drive is secured to the end of a lower steering column 30. Although these two columns 28 and 30 may be mechanically locked together by a friction clutch 32, the clutch 32 is normally disengaged to permit the two columns 28 and 30 to rotate freely relative to each other.

The steering system 10 includes an electrohydraulic system which consists of a front wheel servo system 34, a feel servo system 36 and a computer section 38.

The front wheel servo system 34 comprises a hydraulic cylinder 40 containing a double acting piston 42 operatively interconnected with the nut 26 on the worm 24 for applying a force thereto which will move the dirigible wheels 12. In addition, an electrical circuit is provided for supplying a control signal to a servo valve that regulates the flow of hydraulic fluid into and out of the cylinder 40. The electrical circuit includes a first input 44 which has a two position switch 46 for receiving a command position signal and a second input 48 that has a two position switch 50 for receiving a command torque signal.

One pole 52 of the switch 46 has nothing connected thereto while the other pole 54 is connected to a manually adjustable gain device 56 and also to a variable gain device 58. The variable gain device 58 may be manually adjusted to any desired level but the output varies in response to the strength of a secondary input signal. In the present instance this secondary signal is a reciprocal of vehicle speed. These devices 56 and 58 are connected to switches 60 and 62 respectively.

One pole 64 of the switch 50 in the torque input 48 is connected to the input of a variable gain device 66 that varies the strength of the signal therefrom in response to the reciprocal of the speed of the vehicle. The output of this variable gain device 66 is connected to the input of a manually adjustable gain device 68 leading to the switch 62. The other pole 65 of the torque input switch 50 is connected directly to the input of the manually adjusted gain device 68 so as to permit shorting out the variable gain device 66.

A summing network 70 of conventional design is provided to accept a plurality of input signals and produce an output signal that will be an algebraic sum of the input signals. In the present instance this network 70 includes one input 72 connected to the switch 60 for receiving the modified command position signal and another input 74 connected to the switch 62 for receiving a modified command torque signal. In addition, an input 76 is provided for receiving a feedback signal from an adjustable gain device 78 leading to a suitable position pickup 80 located in the gear box. This will thus supply the summing network 70 with a feedback position signal for indicating the amount of displacement of the dirigible wheels 12 that has been produced by the double acting piston 42.

The summing network 70 also includes at least one input 82 for receiving stability signals obtained from one of the outputs 84 of the computer section 38. If desired, a trim input 86 may also be provided for enabling the driver to vary a trim signal into the summing network for permitting the driver to compensate for any variations in the trim of the vehicle or other similar factors.

The output of the summing network 70 is connected to an amplifier 85 for controlling a hydraulic valve 87 that regulates the cylinder 40.

The feel servo system 36 includes a rotary hydraulic servo motor 88 which is geared to the support steering column 28 for applying a torque thereto which will react with the driver applied torque. In addition, an electrical circuit is provided for supplying a control signal to the servo valve 89 that regulates the flow of hydraulic fluid into and out of the motor 88. The electrical circuit includes a suitable position pickup 90 for sensing the angular position of the steering wheel 14 and producing a command position signal indicative thereof. In the present instance this pickup comprises a multiturn potentiometer 90 that is operatively connected to the drive shaft from the hydraulic servo motor 88. The electrical output from this potentiometer 90 is connected to an adjustable gain device 92, a switch 94 leading to a variable gain device 96 and to the position input 44 in the front wheel servo system 34. In addition, a strain gauge 98 is secured to the upper steering column 28 at a point located between the steering wheel 14 and the hydraulic servo motor 88 for sensing the torque in the shaft 28 and producing a command torque signal indicative thereof. It should be noted that the torque at this point will be equal to the driver applied torque. The output of the strain gauge 98 is connected to a switch 100 which in one position 102 is connected to the torque input 48 in the front wheel servo system 34 and in the other position 104 leads to an adjustable gain device 106. Also, a rate of turn pickup 108 may be provided for sensing the angular velocity of the steering wheel 14. This pickup 108 is preferably a generator geared to the upper steering column whereby rotary movement of the steering wheel 14 will drive the generator at a speed corresponding to the angular velocity of the steering wheel 14. Thus, the output signal from the generator will be a voltage signal indicative of the rate at which the driver is turning the steering wheel 14. The electrical output of the generator is connected to the input of an adjustable gain device 110 and to the input of a variable gain device 112 responsive to a signal proportional to the velocity of the vehicle. The output of these two devices 110 and 112 are connected to a summing circuit 114 for combining the two signals and supplying the two signals to switch 116. The feel servo 36 may also include an input 118 that comprises a switch 120 adapted to be connected to a strain gauge 122 located in the gear box to thereby produce an output signal indicative of the turning forces present in the steering linkage at the king pin. An additional input 124 may be provided that includes a pair of switches 127 and 128 that are adapted to be connected to an output from the computer section 38.

A summing network 126 is also provided in the feel servo 36 for combining the various signals present in this servo and producing an output signal that represents the algebraic sum thereof. The network 126 includes one input 130 connected to a switch 132 that connects to either the variable gain device 96 or the adjustable gain device 92 so that it may receive a modified command position signal. In addition, the network 126 includes inputs 134, 136, 138 and 140 that are connected to the output from the torque adjustable gain device 106; to the switch 142 from the gear box strain gain device 144; to the switch 116 from the rate of turn summing circuit 114 and to the switches 127 and 128 from the computer section 38. Also, an input 146 may be provided for receiving a trim signal that the driver may manually adjust to compensate for variation in the vehicle and steering system. The output 148 of the summing network 126 will be a signal representing the algebraic sum of the various foregoing input signals. The output 148 is connected to an amplifier 150 that increases the signal to a more useful level and supplies the signal to the servo valve 89 for controlling the hydraulic servo motor 88. Thus the motor 88 will apply a torque to the upper steering column 28 that will tend to turn the steering wheel 14.

The computer section 38 includes various pickups that are mounted on the vehicle so as to be subjected to static and dynamic responses of the vehicle. These pickups may be any suitable instruments 152 for sensing any of the various operating conditions for which it may be desired to compensate. For example, a roll rate gyroscope may be provided for sensing the rate at which the body of the vehicle is rotating or rolling about its longitudinal axis and producing a signal indicative of this rate. In addition, a linkage responsive to the angularity between the body and the rear axle may be provided for producing a signal indicative of the amount of roll. In addition, a rate gyroscope may be provided for sensing the rate at which the vehicle is yawing and to produce a signal representing the yaw rate. This may also be utilized to produce a signal indicative of the yaw acceleration. Also, an accelerometer may be provided for indicating the amount of lateral acceleration of the vehicle and a tachometer driven from the transmission for producing a vehicle speed signal.

One group of outputs 154 from these instruments 152 is connected to the inputs 156 to a variable stability modifying computer 158. This computer 158 includes a plurality of variable gain controls 160, 162 and 164, etc. for individually controlling the strength of each of the stability signals. The output 166 from this computer 158 may comprise a single conductor or a group of conductors connected to the switch 168 at the input 82 to the summing network 70. It may thus be seen that the network 70 will be supplied with signals representing the various operating conditions of the vehicle that are to be considered and that the effectiveness of each of the signals may be varied by adjustment of the individual controls 160, 162, 164, etc.

A second group of outputs 170 from the instruments 152 is connected to the inputs 172 to a steering wheel feel servo computer 174. This computer 174 includes a plurality of variable gain controls 176, 178, 180, etc. for individually controlling the strength of each of the stability signals. The signals that are supplied to this computer 174 do not necessarily represent the same factors that are supplied to the first computer 158 and the strength of the signals in one computer may be varied independently of the strength of the corresponding signal in the other computer. The output 182 from the computer 174 may be one or more conductors that are connected to the input 124 of the feel servo system 36.

The speed signal is supplied to the input 184 of a multiplying circuit 186 which is effective to produce signals in the outputs 188, 190 and 192 that are functions of the vehicle speed, the reciprocal of vehicle speed and the square of vehicle speed respectively. Each of these outputs 188, 190 and 192 is connected to the variable gain devices 58, 66, 112 and 96 respectively as indicated above for varying the outputs thereof in the indicated manner.

In the event it is desirable to employ manual steering in which the steering wheel is positively connected to the dirigible wheels, the clutch 32 is engaged so as to mechanically lock the upper steering column 28 to the lower steering column 30. Engagement of the clutch 32 will simultaneously open the by-pass valves 200 and 202 and permit the hydraulic fluid to bypass the cylinder 40 and also the hydraulic motor 88. As a result, the driver will have direct and complete control of the dirigible road wheels 12 free from any effects from either servo system 34 or 36.

One form of operation of the steering system 10 is obtained by placing the variable stability switch control 204 in the "Off" position and the feel servo switch control 206 at the "In" position. The stability switch 204 will open the switch 168 and thereby prevent the front wheel servo summing network 70 receiving any signals from the variable stability modifying computer 158. In addition, switches 94, 116 and 128 will open and the feel summing network will not receive any signals from the feel servo computer 174, the command position signal from the steering wheel position potentiometer 90 or a rate of turn signal from the rate generator 103. However, the switch 142 will be closed to supply the feel summing network 126 with a torque signal from the strain gauge 122 and indicative of the road forces on the dirigible wheels 12. The feel servo switch control 206 will close the switch 46 to supply a command position signal from the potentiometer 90 to the front wheel servo network 70. Since the switch 100 is in the position 104 no command torque signal will be fed to the summing network 70. However, a feedback position signal from the strain gauge 122 in the gear box will be fed into the summing network 126. The summing network 126 will thus have an output signal indicative of the difference between the steering wheel position signal and the dirigible wheel position signal and, accordingly, the dirigible wheels 12 will be moved by power piston 42 to the desired position. The amount of this movement, i.e., the steering ratio, will be a function of the setting of the variable gain device 58. In addition, since the gain of this device varies as the reciprocal of the velocity of the vehicle, the steering ratio will not be constant but will vary with speed. It has been found that by varying the steering ratio in this manner, the lateral acceleration will be substantially constant for any given setting of the steering wheel 14. As a result, the driver will always manipulate the steering wheel 14 through a similar range irrespective of the speed of the vehicle and the driver will not tend to over-control the vehicle at higher speeds.

At the same time the strain gauge 122 in the gear box will produce a torque signal that will be fed through the switch 120, the adjustable gain device 144, the switch 142 and into the summing network 126. As a result, the output of the summing network 126 will be a signal indicative of the road torque present in the steering linkage 16. This signal will pass through the amplifier 150 and actuate the servo valve 89. Thus, the hydraulic motor 88 will produce a counter torque on the upper steering column 28 indicative of the road torque.

It should be noted that, as previously stated, the dirigible wheels 12 will be positioned in response to the displacement of the steering wheel 14 and the reciprocal of vehicle speed and the driver may manually set the steering ratio to any desired amount by adjusting the gain of device 58. In addition, the counter torque applied to the upper steering column 28 by the hydraulic motor 88 will be determined by the gain of the device 144. Thus, the driver may manually adjust the amount of power assistant that will be supplied by the system by adjusting the gain of the device 144.

In order to obtain a different type of steering, the variable stability switch control 204 may be moved to the "On" position while the feel servo switch control 206 remains at "In." In this event all of the switches will be positioned as shown in the drawing. Thus, a command position signal from the potentiometer 90 will be supplied to the input of the speed responsive variable gain device 58. As a result, a speed modified command position signal will be fed to the summing network 70 in the same manner as before. Since the switch 100 from the strain gauge 98 will not be moved, there will still be no command torque signal supplied to the summing network 70. However, since the switch 168 will now be closed the output signal from the stability computer 158 will be applied to the input 82 of the summing network 70. The summing network 70 will then combine the feedback position signal from the gear box, the command position signal from the upper steering column 28 and the stability signal from the computer 158 to produce a control signal that will be fed to the amplifier 85.

It may thus be seen that the dirigible wheels 12 will be positioned in the same manner as before. However, the amount of displacement of the dirigible wheels 12 for a given steering wheel displacement will not only vary inversely with vehicle speed but will also vary in response to the various operating conditions such as the vehicle yaw, body roll, lateral acceleration, etc.

The opening of the switch 142 removes the signal indicative of the forces on the dirigible wheels 12 from the input 136 to the summing network 126. However, the switch 100 will feed the steering column torque signal through the device 106 and into the summing network 126 and the command position signal will pass through the speed responsive variable gain device 96 and be fed into the summing network. The summing network 126 will then combine this signal with the rate of turn signal and the output signal from the feel servo computer 186 to produce a resultant signal that will be fed to the amplifier 150. The amplifier 150 will then actuate the servo valve 89 so as to cause the hydraulic motor 88 to apply a counter torque to upper steering column 28. Thus, the operator will be able to "feel" the various factors affecting the vehicle's operation.

If an additional type of operation is desired, the variable stability switch control 204 may remain in the "On" position and while the feel servo switch control 206 is placed in the "Out" position. With this arrangement the input switch 46 in the front wheel servo 34 will be open so that a command position signal cannot be supplied to the summing network 70. However, the switch 100 from the strain gauge 98 will be closed. Thus a command torque signal indicative of the amount of driver applied torque in column 28 will be fed to the input switch 50 in the front wheel servo 34. Depending upon the position of this switch 50 the signal will flow through the speed responsive variable gain device 66 or directly to the adjustable gain device 68. The command torque signal is then fed through the gain control 68 and the speed responsive variable gain device 58. Thus, the summation network 70 will not receive a command position signal but it will receive a command torque signal that will be combined with the feedback position signal from the pickup 80 and the variable stability signal from the computer 158. Thus the amplifier 85 will actuate the servo valve 87 until the piston 42 positions the dirigible wheels 12 to cause all of the input signals to the summing network 70 to be balanced.

With the switches set in this manner, the strain signals from the strain gauge 122 in the gear box and the strain gauge 98 on the steering column 28 cannot enter the summing network 126. Also, the output from the feel computer 174 will be prevented from entering the summing network 126. As a result, there will be no variable signals fed into the summing network 126 and the hydraulic motor 88 will not rotate. Accordingly, the steering column 26 will be locked in position and the driver will not be able to turn the steering wheel 14. However, the amount of torque he applies in endeavoring to do so will cause the dirigible wheels 12 to move a corresponding amount.

It is to be understood that, although the invention has been described with specific reference to a particular embodiment thereof, it is not to be so limited since changes and alterations therein may be made which are within the full intended scope of this invention as defined by the appended claims.

What is claimed is:
1. In a vehicle having dirigible wheels, control means for positioning said wheels, said means comprising a steering linkage mechanically connected to said dirigible wheels, a manually actuated steering wheel mechanically independent of said steering linkage, power means mechanically connected to said steering linkage for positioning said dirigible wheels, means responsive to the position of said steering wheel for actuating said power means to move said dirigible wheels as a direct function of the steering wheel movement, and servo means for applying a torque to said steering wheel for reacting with the torque manually applied thereto, said servo means being responsive to the position and the rate of movement of said steering wheel and being further responsive to the torque applied to said steering wheel.

2. In a vehicle having dirigible wheels, control means for positioning said wheels, said means comprising a steering linkage mechanically connected to said dirigible wheels, a manually actuated steering wheel mechanically independent of said steering linkage, power means mechanically connected to said steering linkage for positioning said dirigible wheels, means responsive to the position of said steering wheel for actuating said power means to move said dirigible wheels as a direct function of the steering wheel movement, means for applying a torque to said steering wheel for reacting with the torque manually applied thereto, said last means being responsive to the rate at which said steering wheel is turning for varying the amount of said applied torque.

3. In a vehicle having dirigible wheels, control means for positioning said wheels, said means comprising a steering linkage mechanically connected to said dirigible wheels, a manually actuated steering wheel mechanically independent of said steering linkage, power means mechanically connected to said steering linkage for positioning said dirigible wheels, means repsonsive to the position of said steering wheel for actuating said power means to move said dirigible wheels as a direct function of the steering wheel movement, means for applying a torque to said steering wheel opposing the torque manually applied thereto, said last means being responsive to the angular velocity of said steering wheel and to the angular displacement of said steering wheel for varying the amount of said torque.

4. In a vehicle having dirigible wheels, control means for positioning said wheels, said means comprising a steering linkage mechanically connected to said dirigible wheels, a manually actuated steering wheel mechanically independent of said steering linkage, power means mechanically connected to said steering linkage for positioning said dirigible wheels, means responsive to the position of said steering wheel for actuating said power means to move said dirigible wheels to a position which is a function of the steering wheel position, means for applying a torque to said steering wheel opposing the torque manually applied thereto, said last means being responsive to a direct function of the angular velocity of the steering wheel and the speed of the vehicle and further being responsive to a direct function of the angular displacement of the steering wheel and the square of the speed of the vehicle for varying the amount of said applied torque.

5. In a vehicle having dirigible wheels, control means for positioning said wheels, said means comprising a steering linkage mechanically connected to said dirigible wheels, a manually actuated steering wheel mechanically independent of said steering linkage, power means mechanically coupled to said steering linkage for positioning said dirigible wheels, means adapted to produce a first signal that is a direct function of the angular displacement of said steering wheel and an inverse function of the speed of said vehicle, means adapted to produce a second signal that is a direct function of the angular displacement of said dirigible wheels, means for producing a third signal that is a direct function of the angular velocity of the steering wheel and a direct function of the speed of the vehicle, means for producing a fourth signal that is a direct function of the torque applied to the steering wheel, means for producing a fifth signal that is a direct function of the angular displacement of the steering wheel and a direct function of the square of the speed of the vehicle, first summing means adapted to be responsive to said first and second signals and to energize said power means, torque means coupled to said steering wheel and adapted to apply a reverse torque thereto, and second summing means adapted to be responsive to said third, fourth, and fifth signals and to energize said torque means.

6. In a vehicle having dirigible wheels, control means for positioning said wheels, said means comprising a steering linkage mechanically connected to said dirigible wheels, a manually actuated steering wheel mechanically independent of said steering linkage, power means mechanically coupled to said steering linkage for positioning said dirigible wheels, means adapted to produce a first signal that is a direct function of the angular displacement of said steering wheel, means adapted to produce a second signal that is a direct function of the angular displacement of said dirigible wheels, means for producing a third signal that is a direct function of the angular velocity of the steering wheel, means for producing a fourth signal that is a direct function of the torque applied to the steering wheel, first summing means adapted to be responsive to said first and second signals and to energize said power means, torque means coupled to said steering wheel and adapted to apply a reverse torque thereto, and second summing means adapted to be responsive to said first, third, and fourth signals and to energize said torque means.

7. In a vehicle having dirigible wheels, control means for positioning said wheels, said control means comprising a steering linkage mechanically connected to said wheels, a manually actuated steering member mechanically independent of said steering linkage, servo follow-up means mechanically coupled to said steering linkage for positioning said dirigible wheels in response to an electrical signal, means adapted to produce a first signal that is a direct function of the displacement of said steering member, said first signal being applied to said servo follow-up means, means for producing a second signal that is a function of the velocity of movement of the steering member, means for producing a third signal that is a function of the force applied to the steering member, power means coupled to said steering member and adapted to apply a force thereto in opposition to the manually applied force in response to an electrical signal, and translating means connected to receive said first, second, and third signals and adapted to energize said power means in response thereto.

References Cited in the file of this patent
UNITED STATES PATENTS

| | | |
|---|---|---|
| 2,512,979 | Strother | June 27, 1950 |
| 2,754,465 | Brier | July 10, 1956 |
| 2,760,590 | Stolte | Aug. 28, 1956 |
| 2,796,945 | Dye et al. | June 25, 1957 |
| 2,798,567 | Staude | July 9, 1957 |
| 2,808,659 | Dehmel | Oct. 8, 1957 |
| 2,865,462 | Milliken | Dec. 23, 1958 |
| 2,907,399 | Spannhake | Oct. 6, 1959 |